United States Patent [19]

Gauert et al.

[11] Patent Number: 5,020,911
[45] Date of Patent: Jun. 4, 1991

[54] RING LASER GYRO COMPRISING ROTARY OSCILLATION APPARATUS

[75] Inventors: Rolf Gauert, Alzenau; Werner Hansli, Alsbach, both of Fed. Rep. of Germany

[73] Assignee: Honeywell Regelsysteme GmbH, Fed. Rep. of Germany

[21] Appl. No.: 529,160

[22] Filed: May 25, 1990

[30] Foreign Application Priority Data

Jun. 2, 1989 [DE] Fed. Rep. of Germany ....... 3918049

[51] Int. Cl.⁵ ............................................. G01C 19/64
[52] U.S. Cl. ........................................ 356/350; 372/94
[58] Field of Search .......................... 356/350; 372/94

[56] References Cited

U.S. PATENT DOCUMENTS 4,634,091 1/1987 Butler .............................. 356/350 X

FOREIGN PATENT DOCUMENTS 3708661 9/1987 Fed. Rep. of Germany .
1536081 10/1977 United Kingdom .

Primary Examiner—Vincent P. McGraw
Attorney, Agent, or Firm—Haugen and Nikolai

[57] ABSTRACT

In a laser block (10) spokes (26,28,30) and a hub (34) are mechanically worked out resulting in a monolithic integration of a dither device into the laser block.

17 Claims, 1 Drawing Sheet

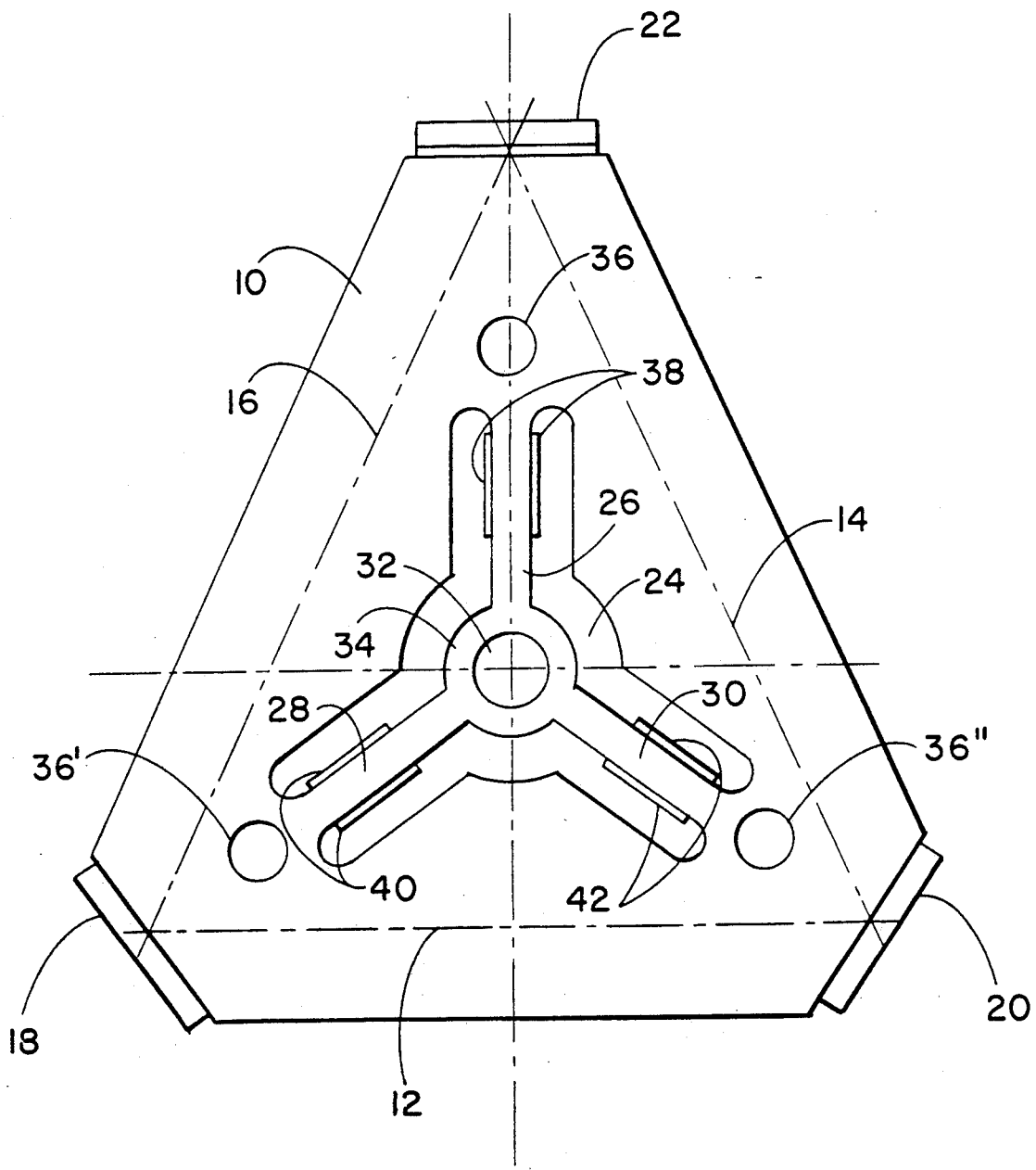

RING LASER GYRO COMPRISING ROTARY OSCILLATION APPARATUS

BACKGROUND OF THE INVENTION

The present invention relates generally to ring laser gyros and, more particularly, to a ring laser gyro comprising rotary oscillation apparatus.

In a ring laser gyro two electromagnetic waves in the form of monochromatic light beams are produced which are propagating in opposite directions. A rotation of the ring laser gyro about its input axis increases the path length for one light beam whereas the path length for the other light beam is reduced. The resulting path length change produces a frequency shift within each of the light beams since the oscillating frequency of the laser beams depends on the length of the laser path. Therefore the frequency difference is a function of the rotation rate.

At low rotational rates the frequency difference between both light beams becomes small and both light beams have the tendency to oscillate on the same frequency which effect is known as lock-in. In order to prevent this mutual interference of both light beams at low rotational rates it is well known to impart a rotary oscillation to the ring laser gyro so that the known lock-in effect is eliminated to a large extent.

In order to produce the rotary back and forth oscillation normally a mechanical oscillating device is provided which imparts a dither motion to the ring laser gyro. Such a device consists commonly of a spoked wheel which is inserted into a cut-out of the ring laser gyro where the hub of the wheel is stationarily mounted to a housing. Piezo-electrical elements mounted on the spokes produce an oscillating back and forth movement of the ring laser gyro when they are driven by according signals. An example of such a device may be taken from German Patent DE-OS 29 39 066 for a triangular laser structure and from GB-PS 15 36 081 for a rectangular laser structure.

SUMMARY OF THE INVENTION

Departing from the above-described prior art it is the primary object of the present invention to devise a ring laser gyro which eliminates the need for a separate oscillating device. The invention provides a ring laser gyro comprising a block of glass ceramics or of another gas-tight material having a low temperature expansion coefficient. The block includes bores to provide a closed laser path and further comprises means to oscillate the block. The oscillating means comprises spokes between a stationary inner portion and a movable outer portion. The spokes are formed by a removal of material from the laser block so that they form an integral component of the laser block.

BRIEF DESCRIPTION OF THE DRAWINGS

Other objects, features and advantages of the invention will be apparent through the description of the preferred embodiment, claims and drawings herein.

The sole FIGURE shows one embodiment of a ring laser gyro as provided by the invention having rotary oscillation apparatus therein.

DESCRIPTION OF THE PREFERRED EMBODIMENT

According to the sole FIGURE, one embodiment of a ring laser gyro as provided by the invention comprises a block 10 of glass ceramics or another material into which bores, indicated by broken lines 12, 14 and 16, forming a closed laser path is machined. Along this closed laser path two laser beams are propagating in opposite directions whereat the gas discharge is sustained by means of anodes and a cathode (not shown). In the corner points of the triangular-shaped block 10 two reflecting mirrors 18, 20 and a further mirror 22 are provided which further mirror besides reflecting of the laser beams additionally serves to read-out the laser beams. The mirrors may be partly adjustable in order to optimize the laser path length as is known in the prior art.

Three spokes 26, 28 and 30 are formed from the triangular-shaped laser block 10 by removal of material e.g. by milling-out 24. Each spoke projects from the center and gravity point of the equal-sided triangle to the corner points. By a first bore 32 in the center a hub 34 is formed by which the laser block 10 may be put on a mandrel (not shown) which is fixed to a housing. Further bores 36, 36' and 36" between the ends of the spokes and the corner points of the triangle serve to relieve mechanical stresses which occur due to vibration movement.

By means of the dimension and the shape of the spokes the characteristic frequency of the oscillation may be determined. Preferably the width of the spokes along their length is not constant. For example, the shape in a plan view may be a trapezoid wherein the spokes are tapered to their outer ends in order to achieve a more uniform stress load.

The vibration drive is achieved in a known manner by piezo-electrical elements 38, 40 and 42 which are bonded to the spokes and which result in a deflection of those spokes when accordingly electrical driven and therefore achieve a vibration motion of the block 10.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A ring laser gyro comprising a block of gas-tight material, respectively having a low temperature expansion coefficient with said block comprising bores to provide a closed laser path and further comprising means to oscillate said block with said means comprising spokes between a stationary inner portion and a movable outer potion, wherein said spokes are formed by a removal of material from said laser block so as to form an integral component of said laser block.

2. The ring laser gyro of claim 1, comprising a triangular-shaped block wherein the spokes extend from the center of gravity of said triangle to the corner points.

3. The ring laser gyro of claim 2 wherein the spokes pass over to a central hub which is stationarily mounted.

4. The ring laser gyro according to claim 2 including a plurality of additional stress relief bores in the block wherein each stress relief bore is located on a line between the spokes and the corner points of the triangle.

5. The ring laser gyro of claim 2 wherein the spokes comprise a different width over their length.

6. The ring laser gyro of claim 5 wherein the spokes in a plan view have the shape of an oblong trapezoid.

7. The ring laser gyro of claim 6 wherein the spokes are tapered from the inside to the outside of the triangle.

8. The ring laser gyro of claim 1 wherein the spokes are milled-out from the laser block.

9. The ring laser gyro of claim 2 wherein the spokes comprise a constant width over their length.

10. The ring laser gyro of claim 2 wherein the spokes first are reduced in their width and then are widened with respect to their width.

11. The ring laser gyro of claim 1 wherein the block comprises glass ceramic material.

12. The ring laser gyro of claim 2 wherein the spokes are milled-out from the laser block.

13. The ring laser gyro of claim 3 wherein the spokes are milled-out from the laser block.

14. The ring laser gyro of claim 4 wherein the spokes are milled-out from the laser block.

15. The ring laser gyro of claim 5 wherein the spokes are milled-out from the laser block.

16. The ring laser gyro of claim 6 wherein the spokes are milled-out from the laser block.

17. The ring laser gyro of claim 7 wherein the spokes are milled-out from the laser block.

* * * * *